United States Patent Office 3,294,740
Patented Dec. 27, 1966

3,294,740
METHOD OF POLYMERIZING CYCLOTRI-
SILOXANES II
Donald E. McVannel, Midland, Mich., assignor to Dow
Corning Corporation, Midland, Mich., a corporation of
Michigan
No Drawing. Filed Jan. 25, 1965, Ser. No. 427,969
20 Claims. (Cl. 260—46.5)

This is a continuation-in-part of application Serial Number 267,766, filed March 25, 1963, now abandoned.

This invention relates to a new method of polymerizing diorganosiloxane cyclic trimers. This invention also relates to a new method of polymerizing silethylenesiloxane cyclic dimers. More specifically, this invention relates to a new class of catalysts for polymerizing the above said cyclic organosilicon compounds.

Organosilicon compounds are widely employed in industry today. Almost all of these presently used materials are polymeric siloxanes or are based on polymeric siloxanes. Many are, or are based on, essentially linear diorganopolysiloxanes. These latter include both the siloxane fluids and siloxane elastomers which constitute the bulk of the commercial products.

In preparing the linear or essentially linear polymers that constitute organosilicon fluids and elastomers it is imporant to have highly pure diorganosiloxane starting materials, or "monomers." One of the easier ways to ensure having essentially difunctional siloxane starting materials is to prepare the diorganocyclosiloxanes containing from three to seven silicon atoms, usually four, per molecule. For the vast majority of siloxanes these materials are readily distilled, so that their preparation and isolation from a mixture which may contain other than difunctional siloxanes allows purification to the necessary degree.

It has been known for many years that under the proper conditions cyclic siloxanes are converted to linear siloxanes of any desired molecular weight ranging from thin fluids to stiff non-flowing gums. Among the catalysts that have been employed are included alkali metal hydroxides, alkoxides and silanolates, tetraorganonitrogen and phosphorus hydroxides and silanolates, hydrochloric acid, sulfuric acid, trifluoroacetic acid and phosphoric acid. However, catalysts such as the above produce from the cyclic siloxanes an equilibrium mixture of linear and cyclic siloxanes, which equilibrium is a function of the kind of siloxane in the system. In the most favorable system for production of linear materials, namely the dimethylsiloxane system, there are at equilibrium about 12 percent by weight of cyclic siloxanes present. These volatile siloxanes are lost when the polymeric substance is heated. Further, if the polymerizing catalyst is not deactivated or removed, the leaving cyclics upset the equilibrium, causing the still active catalyst to form new cyclics at the expense of the linear siloxanes. This vicious cycle of volatilization and compensatory production of new cyclics can continue until the entire polymeric material has been converted to cyclic materials and volatilized away. While this is fine for the production of cyclic siloxanes, it becomes important, in order to keep the desired linear materials, to deactivate or remove such catalysts as referred to above. This operation is cumbersome and costly at best, as with fluids, and extremely difficut to impossible at worst, as with linear non-flowing gums used in elastomers.

When siloxanes other than dimethylsiloxane are polymerized by the conventional methods above, there is at equilibrium a higher percentage of cyclic siloxanes. In fact, this percentage is so high for some siloxanes that these siloxanes do not appear to react when their cyclic siloxanes are contacted with one of the above named catalysts, such as an alkali catalyst. It has been found, however, that if one starts with a particular cyclic, namely the trimer, polymerization to the linear siloxane occurs rapidly enough that before significant equilibration can take place a high polymer is obtained. At this point the catalyst must be deactivated, else equilibration will occur, and in some cases as mentioned above, the polymer will virtually completely degrade to cyclic materials even if none are removed by volatilization. This principle of employing the trimer and deactivating the catalyst at the above stated suitable time is utilized in the preparation of fluorohydrocarbon polysiloxanes, as shown in U.S. Patent 3,002,951.

Another class of organosilicon cyclics that have been employed in the preparation of linear organosilicon compounds are those disclosed in U.S. Patent 3,041,362 (Merker), which are cyclic silethylenesiloxanes of the formula

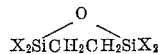

wherein each X is alkyl, cyclohexyl or phenyl. These cyclic materials can be polymerized by the catalysts listed above, and the extremely rapid rate of polymerization (conversion to linear chain configuration) of these cyclics allows polymerization at moderate temperatures, or with the milder catalysts, such as sodium or lithium hydroxide. Often these polymerizations are "stopped" short of equilibration, as in the above discussion recyclotrisiloxanes, by deactivation and/or removal of the catalyst. While the equilibrium ratio of cyclics to linear is more favorable toward the linear specie in this system than in the siloxane system referred to above, it is nevertheless necessary to deactivate or remove the above said catalyst in order to have a polymer of maximum stability at high temperatures. This is amply illustrated by the recommended method of preparing the above-said silethylenesiloxane cyclics, which is to distil the cyclic from the bulk siloxane in the presence of the same catalysts that also cause polymerization from these said cyclics. The removal or deactivation of the polymerization catalyst is as difficult in this system as in the siloxane system.

It has been discovered that a new class of catalysts will polymerize diorganocyclotrisiloxanes and the silethylene siloxane cyclics such as described above to linear polymers without the attendant latter equilibration that occurs with the prior catalysts. These catalysts, because they do not cause equilibration, obviate the necessity for deactivation or removal in order to stabilize the polymer.

It is an object of this invention to provide a new method of preparing organosilicone polymers, namely, by converting cyclotrisiloxanes to linear polysiloxanes and by polymerizing silethylenesiloxane dimer cyclics. Still another object of this invention is to provide a method of preparing linear polysiloxane and silethylenesiloxanes with catalysts which do not need deactivation or removal in order to provide a stabilized polymer. These and other objects which will become apparent are met in the following invention.

This invention relates to a method comprising heating (1) a cyclic compound selected from the group consisting of (a) cyclotrisiloxanes of the unit formula $R_2SiO$ wherein each R is selected from the group consisting of monovalent hydrocarbon radicals, monovalent halohydrocarbon radicals and cyanoalkyl radicals, and (b) each cyclic silethylenesiloxanes of the structure

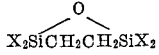

wherein X is independently selected from the group consisting of monovalent hydrocarbon and halohydrocarbon radicals, each free of aliphatic unsaturation, and cyanoalkyl radicals, in contact with (2) a compound of the structure

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive, whereby an increase of the molecular weight of (1) is obtained.

The reaction described above occurs at any temperature including room temperature. Ordinarily, to obtain a conveniently favorable rate, the reaction is carried out at temperatures of from 50 to 200° C. Prolonged heating above 200° C. is generally to be avoided because these high temperatures tend to decompose the essentially organic catalysts. However, the reaction is so rapid at these high temperatures and is complete so quickly that there is no reason for extended heating.

In some instances it is desirable, but not essential, to employ a calcined oxide of calcium, barium or strontium along with these catalysts of this invention. Such a material provides further insurance against depolymerization taking place due to any trace amounts of water that may be present.

Any diorganocyclotrisiloxane or cyclic silethylenesiloxane as described above can be polymerized by the method of this invention. Thus, for the purpose of this invention, each R radical of cyclotrisiloxane (1)(a) above can independently be as defined. Radical R can be alkyl such as methyl, ethyl, butyl, octadecyl and myricyl, both straight and branched chain; unsaturated aliphatic such as vinyl, allyl, methallyl, propargyl and butadienyl; cycloaliphatic such as cyclobutyl, cyclopentenyl and cyclohexadienyl; aralkyl such as benzyl, 2-phenylpropyl and phenethyl; aryl such as phenyl, xenyl, naphthyl, benzylphenyl and anthracyl; and alkaryl such as tolyl, xylyl and t-butylphenyl. Radical R can also be halogenated derivatives of any of the above said radicals, such as chloromethyl, bromobutenyl, dibromocyclopentyl, α,α-difluorobenzyl, perchlorophenyl and hexafluoroxylyl. Radical R can also be any cyanoalkyl radical such as 2-cyanoethyl, 2-cyanopropyl, 4-cyanoisohexyl, and cyanooctadecyl. Generally, preferred radicals are those commercially available, including methyl, ethyl, vinyl, allyl, 2-phenylpropyl, phenyl, xenyl, 3,3,4,4,4-pentafluorobutyl, 3,3,3-trifluoropropyl, β-cyanoethyl and gamma-cyanopropyl.

Cyclotrisiloxane (1)(a) can contain one, two or three different kinds of $R_2SiO$ units therein. Generally, all three units are the same; these trimers are most easily prepared by the method described in U.S. Patent 2,979,519, which briefly comprises contacting a siloxane of the unit formula $R_2SiO$ (with or without other siloxanes such as $R_3SiO_{0.5}$ and $RSiO_{1.5}$) with an alkaline catalyst and heating to distil the corresponding cyclotrisiloxane from the reaction mixture. However, there can be two or even three kinds of diorganosiloxane units in cyclotrisiloxane (1)(a), which can be obtained by, for example, cohydrolysis or by any of several other well known procedures common to silicone chemistry. The exact method by which the cyclotrisiloxane is made is unimportant to the process of the invention.

Thus, cyclotrisiloxane (1)(a) can be a homotrimer, a cotrimer or a mixture of homo- and/or cotrimers. This is advantageous in that copolymers can be prepared by this method employing either a cocyclic trimer, i.e. one containing two or more kinds of siloxane units per trimer, or mixtures of two or more trimers, each containing a different siloxane therein. It is, of course, obvious that each of the two R radicals on a silicon atom can be the same or different.

Silethylenesiloxane cyclic (1)(b) can be any silethylene siloxane cyclic as above defined. Thus, each radical X can be, for example, alkyl such as methyl, ethyl, propyl, butyl, hexyl, octyl, dodecyl, octadecyl and myricyl; cycloalkyl such as cyclobutyl, cyclopentyl and cyclohexyl; aralkyl such as benzyl, phenethyl, 2-xenylpropyl and 4-naphthyl-7-tolyldodecyl; aryl such as phenyl, xenyl, naphthyl, anthracyl, phenanthryl, fluorenyl, naphthacenyl, pyrenyl, indenyl and acenaphthenyl; alkaryl such as tolyl, xylyl, ethylphenyl, t-butylxenyl, octadecylnaphthyl, cumenyl and durenyl; halogenated derivatives of the above such as chloroethyl, 3-chloropropyl, dibromooctadecyl, iodocyclopentyl, 3,3,3-trifluoropropyl, 3,3,4,4,5,5,6,6,7,7,8,8,9,9,9-pentadecylfluorononyl, 2,2-bis(trifluoromethyl)-ethyl, chlorophenyl, α,α-difluorobenzyl and bis(trifluoromethyl)phenyl; and cyanoalkyl such as β-cyanoethyl, gamma-cyanopropyl, deltacyanohexyl and omega-cyanooctadecyl. Generally, preferred radicals are those readily available commercially, including methyl, ethyl, cyclohexyl, phenyl and 3,3,3-trifluoropropyl. It is preferred when the product will be used in a high temperature environment that at least one of the radicals, and most preferably two or more, be phenyl.

The preparation of these silethylenesiloxane cyclics is detailed in the above identified Merker patent, and in copending application Serial No. 251,065, filed January 14, 1963, by Steward (now abandoned). Both of the above references incorporated herein by reference. In the method of Steward, cyclics wherein all X radicals are the same are most easily prepared, while in the Merker method each X can be the same or different. Thus, each X in this present invention can be the same or different, as desired. Additionally, mixtures of two or more silethylenesiloxane cyclics can be employed. Further, component (1) can be either component (a) as described above, component (b) as described above, or a mixture comprising both (a) and (b) components.

Component (2) is the polymerizing catalyst, and functions as a catalyst in that is appears to to be unchanged by the polymerization reaction. It can be any compound as defined above. Thus, for example, substituent R' can be a monovalent hydrocarbon radical such as an aliphatic radical such as methyl, ethyl, t-butyl, vinyl, allyl, butadienyl, propargyl and decyl; a cycloaliphatic radical such as cyclobutyl, cyclopentenyl and cyclohexadienyl; and an aromatic radical such as phenyl, naphthyl, 2-phenylpropyl, tolyl, xylyl and phenethyl. Substituent R' can also be a halogenated derivative of the above said radicals such as chloromethyl, trifluoroethyl, dibromocyclopentyl, chlorophenyl and trifluorotolyl. In addition, R' can be any of the halogen atoms, i.e fluorine, chlorine, bromine or iodine. Further, substituent R' can be a monovalent hydrocarbonoxy radical such as methoxy, ethoxy, allyloxy, decoxy, cyclohexoxy and phenoxy. Substituent R' can be any one of the classes of substituents illustrated above. When more than one R' substituent is present in compound (2), and there can be up to three said R' substituents in the said compound, these R' substituents can be the same or different. The simplest catalysts to obtain and/or prepare are those containing no R' substituents, but these R' substituents can be introduced to function as compatibilizing and/or solubilizing components of the catalyst compound for a particular matrix. This is especially useful, for the rate of polymerization of a given cyclic compound is in part dependent on the catalyst concentration. Thus an insoluble or essentially insoluble catalyst is "active" only at its surface—that is, the interfacial surface between catalyst and cyclic compound—while a soluble catalyst is "active" at the level of essentially molecular dispersion. Therefore, the extent of solubility determines the active concentration of catalyst. This is not to say it is important or necessarily even desirable that the catalyst be soluble in the siloxane system to be polymerized. Many times it may be desirable, for easy catalyst removal or other suitable reason, that the said catalyst be insoluble and that polymerization occur at the surface of the said catalyst. Thus, the wide choice of R' substituents allows a large measure of control of solubility of the catalyst in the particular cyclic system to be polymerized.

Substituent M is as defined above. Thus, substituent M can be any alkali metal, i.e. lithium, sodium, potassium, rubidium, or cesium, or it can be a tetraorganonitrogen radical or tetraorganophosphorus radical, the organic radicals of which are alkyl or aromatic, i.e. methyl, ethyl, t-butyl, octadecyl, myricyl, phenyl, tolyl, or benzyl, each of the organic radicals thereon being the same or different. When more than one —OM radical is present in compound (2), and there can be present from one to three inclusive said radicals, the M substituents thereof can be the same or different, although normally they are the same, as will become apparent from the description of the preparation of these compounds. Preferred M substituents are lithium, sodium, potassium, and tetramethyl-substituted nitrogen, this last commonly called tetramethylammonium, as these substituents are more commonly available.

These compounds are most easily prepared by reacting a phenolic compound of the general formula

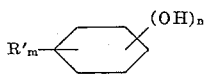

wherein R', $m$ and $n$ have the meanings already defined, with a hydroxide MOH, wherein M has the already defined meaning, in the ratio of one mol of phenolic compound to $n$ moles of MOH. Thus, for example, one mol each of trichlorophenol and tetrabutylphosphonium hydroxide can be reacted, or one mole of t-butylhydroquinone and two mols of potassium hydroxide. Because both starting compounds are ordinarily solids the reaction is normally carried out in a mutual solvent. Water (or mixtures of water with water-miscible alcohols or ethers) is the best solvent, although any liquid that is a solvent for both reactants can be employed. The reaction proceeds on mixing the two reactants in the mutual solvent, often with the evolution of heat. Where the solvent is one that will not interfere with the system to be polymerized, the catalyst is now ready for use and can be added as a solution to the cyclic to be polymerized.

Often, the catalyst solution can be employed, thereafter immediately removing the catalyst solvent by flash stripping or other suitable operation. However, for convenience in storage, handling and metering, it is preferred that the solvent be removed and the product be recovered dry. It has been found that these compounds are quite stable to moisture, easy to dehydrate and easily storable in the anhydrous state. This is in marked contrast to the usual polymerization catalysts such as the silanolates and alcoholates, which are extremely hygroscopic and hydrolyze rapidly and completely in the presence of moisture, and the corresponding hydroxides which readily hydrate.

Specific examples of catalysts operable in this invention include lithium phenoxide, sodium-p-methylphenoxide,

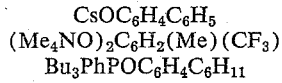

$ClC_6H_4OK$, $(RbO)_2C_2H_3ONa$, $KOC_6H_4(OC_2H_5)$ and $(NaO)_2C_6H_3(OC_6H_5)$.

The method of this invention is carried out merely by mixing components (1) and (2). Since component (2) appears to be a true catalyst, only small amounts of the latter, on the order of 0.01 to one percent by weight, need be used, particularly if the catalyst employed is quite soluble in the cyclic to be polymerized, but larger amounts than this without limit can be employed without harm. Obviously it is wasteful and senseless to employ more of component (2) than is necessary.

The method of this invention can be carried out in an organic liquid, if desired. Any organic liquid not reactive with either the cyclic material being used or the catalyst can be employed. It should be pointed out that where a high polymer is desired, the solvent selected should be a solvent for the said linear polymer. Examples of solvents that can be employed, if desired, include hydrocarbons such as hexane, heptane, cyclohexane, benzene, toluene, naptha, and commercial solvents which are mixtures of hydrocarbons in specified boiling ranges; ethers such as dibutyl ether, diethyl ether, methylamyl ether and the dimethylether of ethylene glycol; esters such as butyl acetate; halogenated hydrocarbons such as methylene chloride, chlorobromobutane and difluorohexachloropentane; ketones such as acetone, methylisobutyl ketone and difluorotetrachloroacetone; halogenated ethers such as $\beta,\beta'$-dibromodiethyl ether; and nitriles such as acetonitrile and benzonitrile.

When it is desired to obtain the highest viscosity polymer, care should be exercised to exclude or remove even trace amounts of moisture, even of atmospheric moisture, as is well known in the art. The same methods can be employed in this instance as are commonly employed in conventional methods, such as purging with an inert dry gas such as nitrogen, drawing a vacuum to thereby remove moisture, or by pre-drying the reactants. This latter is facilitated in this instance by the fact that the catalyst is easily obtained dehydrated and easily maintained that way.

When a diorganopolysiloxane has been prepared by the method of this invention the catalyst need not be removed or deactivated. However, it can be, if desired. The reason it need not be removed or deactivated is that the catalyst is not active toward the high polymer; that is, the catalysts of this invention are not siloxane bond rearranging catalysts. Thus, when the cyclotrisiloxane component has been transformed to the linear diorganopolysiloxane product there remains no siloxane in the system that is susceptible to reaction with the catalyst. When it is desired to remove the catalysts of this invention, it can be done most easily by washing the polymer containing the catalysts to be removed with water. The catalyst is water soluble and is removed by the water.

This method is suitable for preparing linear polymers from cyclic trisiloxanes and/or cyclic silethylenesiloxanes. The resulting linear polymers are suitable as, for example, gums for the formulating of silicone rubber stocks. This method is especially useful when it is desired to obtain an organosilicon polymer that is a highly pure difunctional polymer.

The following examples are illustrative only and are not to be construed as limiting the invention, which is properly delineated in the appended claims.

*Example 1*

About 33 g. of 3,3,3-trifluoropropylmethylsiloxane cyclic trimer and about 0.033 g. of lithium phenoxide were mixed together and heated in a sealed bottle for 17 hours at 177° C. A high polymer resulted.

*Example 2*

Equivalent results are obtained when similar quantities of the following cyclotrisiloxanes and catalysts are substituted for the cyclic siloxane and lithium phenoxide, respectively of Example 1.

| Cyclotrisiloxane | Catalyst |
|---|---|
| $[(CH_3)(C_{18}H_{37})SiO]_3$ | $[(CH_3)_3(C_6H_5CH_2)NO]_2$ ⌬—$C_{10}H_{21}$ |
| $\begin{bmatrix} CH_2CH_2 \diagdown \\ \quad\quad CHSiO \\ CH_2CH_2 \diagup \end{bmatrix}_3$ with $CH_2CH_3$ branch | CsO—⌬(Cl)(Cl)—$C_6H_{13}$ |
| $\begin{bmatrix} CH_3 \\ \mid \\ CNCH_2CH_2SiO \end{bmatrix}_3$ | ⌬—(ONa)$_3$ |
| $\begin{bmatrix} CH=CH_2 \\ \mid \\ ClC_6H_4SiO \end{bmatrix}_3$ | NaO—⌬($OC_2H_5$)($OC_2H_5$)($OC_2H_5$) |
| $\begin{bmatrix} C_6H_5 \quad CH_3 \\ \mid \quad\quad \mid \\ CH_3CH—CH_2SiO \end{bmatrix}_3$ | $CH_2=CHCH_2$—⌬—OK |
| $\begin{bmatrix} CH_3 \\ \mid \\ CHF_2CF_2CH_2CH_2SiO \end{bmatrix}_3$ | $(CF_3CH_2)_3$—⌬—ORb |
| $\begin{bmatrix} CH_3 \\ \mid \\ CH_2=CHCH=CHSi \end{bmatrix}_3$ | ⌬—⌬—OLi |
| $\begin{bmatrix} CH_2CH(CH_3)_2 \\ \mid \\ CH_3C_6H_4SiO \end{bmatrix}_3$ | Cl—⌬($CH_2CFCH_2$)($C_6H_5$)—$OP(C_4H_9)_4$ |

Example 3

When 100 g. of propylmethylsiloxane cyclic trimer are dissolved in 400 g. of toluene and there is added thereto 0.5 g. of sodium p-phenylphenoxide, and thereafter the solution heated at reflux with azeotrope, there is obtained a toluene solution of high linear polymer of propylmethylsiloxane.

Example 4

A mixture of 67.6 g. (0.4975 mol) of phenylmethylsiloxane cyclic trimer, 0.181 g. (.0025 mol) of methylvinylsiloxane cyclic trimer and 0.0025 g. of lithium phenoxide was heated two hours at 189° C. with agitation and under a sweep of dry nitrogen. The Li/Si ratio was 1/20,000. A high polymer (Williams plasticity 0.099", determined on 4.2 g. of polymer) resulted, having a percent conversion from the cyclic of 85.3 percent.

A similar mixture employing lithium phenoxide in the ratio 1 Li/40,000 Si, polymerized for 2¾ hours at 189° C., gave a high polymer having a Williams plasticity of 0.098".

Example 5

A mixture of 74.25 g. (0.375 mol) of diphenylsiloxane cyclic trimer, 17.00 g. (0.125 mol) of phenylmethylsiloxane cyclic trimer and 0.0025 g. of lithium phenoxide was heated 1¼ hours at 210° C. with dry nitrogen sweep and agitation. The resulting polymer was a very hard opaque solid at room temperature, having a softening point above 200° C.

Example 6

A mixture of 20 g. of dimethylsiloxane cyclic trimer and 0.0027 g. of lithium phenoxide was placed in a sealed glass tube and heated six hours at 190° C. The resulting high polymer had a Williams plasticity of 0.040".

Example 7

In this example seven polymers were made from identical quantities of the same cyclic trimers, which were 77.67 g. (0.4979 mol) of 3,3,3-trifluoropropylmethylsiloxane cyclic trimer and 0.181 g. (0.0021 mol) of methylvinylsiloxane cyclic trimer. The amount of lithium phenoxide was varied and the polymerization time was varied. Agitation and nitrogen sweep were provided, and all polymerizations were run at 188 to 190° C. In the table below are shown for the samples (1) molar silicon atom to lithium ion ratio (Si/Li), polymerization time (hours), plasticity of the resulting polymer (Williams plasticity, measured in a 4.2 g. sample) and weight percent of conversion (conversion from cyclic to linear, determined by volatilizing the unconverted cyclic trimer from a known weight of polymer and weighing the loss).

| Sample | Si/Li | Polymerization time, hours | Plasticity, inch | Percent Conversion |
|---|---|---|---|---|
| 1 | 5,000 | 2½ | 0.036 | 89.1 |
| 2 | 10,000 | 1½ | .079 | 97.1 |
| 3 | 20,000 | 17 | .073 | 90.3 |
| 4 | 20,000 | 2 | .082 | 97.2 |
| 5 | 40,000 | 2 | .085 | 96.0 |
| 6 | 80,000 | 2 | .084 | 95.9 |
| 7 | 100,000 | 4 | Fluid | 32 |

Because the catalyst is not soluble in the particular cyclic siloxane used, the dispersion is an important factor. This is graphically illustrated in a comparison of samples 3 and 4 wherein for sample 3 very poor dispersion of the catalyst was obtained, so that even after 17 hours the conversion in this sample was less than for sample 4, wherein good dispersion of the catalyst was obtained.

The like degree of conversion of samples 5 and 6 at widely divergent catalyst concentrations again shows the critical effect of dispersion. Here, as before, better dispersion produced an apparent faster reaction. The low degree of conversion of sample 7 is no doubt due to poor dispersion. Considering that the catalyst ratio is a molecular one and that the dispersion is obviously considerably less than molecular, this last sample demonstrates the truly small amount of catalyst necessary to effect reaction.

Example 8

This example illustrates the beneficial effect of using a water scavenger in the polymerization, and also illustrates the irreversibility of the polymerization as opposed to the prior art catalysts.

The cyclic trimer of 3,3,3-trifluoropropylmethylsiloxane was used throughout the experiments in this example. Sample A was polymerized with sodium hydroxide, a standard catalyst for this system, in an amount to give one Na ion per 5000 silicon. Sample B was polymerized with KOH, employing 1 K per 5000 silicon. Samples A and B were both polymerized with stirring under a sweep of dry nitrogen.

Samples C, D and E were polymerized in sealed bottles. Mixing was by hand shaking at regular intervals while effective. Sample C contained sodium phenoxide in the amount of 1 Na/5000 silicon. Sample D contained the same as C, and additional 3 percent by weight of powdered calcined calcium oxide. Sample E contained potassium phenoxide in an amount of 1 K/5000 Si and 3 percent by weight of powdered calcined calcium oxide.

All polymerizations were at 150° C. Observations were made of the polymerization and are shown in the table below.

| Sample | Time | Observed |
|---|---|---|
| A | 5 min | Polymerizing. |
|   | 20 min | High gum. |
|   | 1 hour | Do. |
|   | 8 hours | Thick fluid. |
|   | 24 hours | Thin fluid. |
|   | 3 days | Analyses about 95 wt. percent cyclic tetramer. |
| B | 15 sec | Polymerizing. |
|   | 1 min | High gum. |
|   | 5 min | Depolymerizing. |
|   | 1 hour | Analyses about 95 wt. percent cyclic tetramer. |
| C | do | High polymer. |
|   | 65 hours | Thick fluid. |
| D | ¾ hour | High polymer. |
|   | 4 hours | Do. |
|   | 17 hours | Do. |
|   | 3 days | Do. |
|   | 12 days | Do. |
| E | 1 hour | Do. |
|   | 3 hours | Do. |
|   | 6 hours | Do. |
|   | 12 hours | Do. |

A comparison of samples A and C shows that the polymerization rate of the two sodium catalysts is the same, but that the sodium hydroxide attacks the linear polymer to form equilibrium cyclics. The thick fluid of sample C was virtually volatile-free, and from the results of sample D, wherein CaO functions as a drying agent, indicates that water can break the linear 3,3,3-trifluoroproplymethylpolysiloxane chain under the conditions of this experiment. It is already known that, under pressure and in the presence of ammonia or a primary organic amine, water will rupture siloxane bonds to make short linear chains from long ones.

The difference in reactivity of the hydroxide versus the phenoxide is most graphically shown by comparing samples B and E. Potassium hydroxide completely depolymerizes the polymer in one hour, while the polymer made using potassium phenoxide is unaffected in 12 hours.

Example 9

A series of copolymers was prepared, varying the penylmethylsiloxane (I) content and the 3,3,3-trifluoropropylmethylsiloxane (II) content, each over a wide range. All polymerizations were conducted under a dry nitrogen sweep with stirring, for two hours at 190° C. A small (constant) quantity (0.5 mol percent) of methylvinylsiloxane was included by adding the cyclic trimer to each charge. The catalyst was lithium phenoxide, added as a powder in an amount to give 1 Li/10,000 Si, addition being made after the cyclic trimers had been heated to 190° C. Plasticities of the polymers were determined (Williams plasticity measured on a 4.2 g. sample). Weighed portions of each copolymer, with catalyst still present were heated 24 hours at 150° C. in an air-circulating oven, cooled and weighed, returned to the oven for four more days, cooled and again weighed. Percent weight loss was determined from the three weights. The 24 hour loss was considered to be virtually all unconverted cyclic trimers. That the catalyst was not causing depolymerization is shown by the almost negligible additional loss of weight after the first day.

| Sample | Mol percent $CF_3CH_2CH_2(CH_3)SiO$ | Mol percent $C_6H_5(CH_3)SiO$ | Plasticity, inch | Weight loss | |
|---|---|---|---|---|---|
| | | | | 24 hrs. | 5 days |
| 1 | 94.5 | 5.0 | .075 | 19.1 | 19.8 |
| 2 | 89.5 | 10.0 | .082 | 18.0 | 19.0 |
| 3 | 79.5 | 20.0 | .098 | 16.0 | 17.2 |
| 4 | 49.5 | 50.0 | (1) | 5.3 | 5.6 |
| 5 | 20.0 | 79.5 | (1) | 3.3 | 4.1 |
| 6 | 10.0 | 89.5 | (1) | 1.7 | 2.4 |
| 7 | 5.0 | 94.5 | .141 | 1.1 | 2.1 |

1 Note 1.
Note 1—Copolymer was tough, film-forming, dry and completely soluble in acetone.

Example 10

A mixture of 146.64 g. (0.940 mol) of 3,3,3-trifluoropropylmethylsiloxane cyclic trimer, 9.53 g. (0.0275 mol) of triphenylmethylsilethylenesiloxane cyclic dimer, 1.56 g. of powdered calcined CaO and 0.0116 g. of sodium phenoxide was heated in a confined container with stirring for three hours at 150° C. A high molecular weight copolymer resulted.

Example 11

A mixture of 40.46 g. (.2975 mol) of phenylmethylsiloxane cyclic trimer, 39,60 g. (0.2000 mol) of diphenylsiloxane cyclic trimer, 0.181 g. (.0025 mol) of vinylmethylsiloxane cyclic trimer and 0.0050 g. of lithium phenoxide was heated with stirring under a dry nitrogen sweep for 2½ hours at 190° C. A high molecular weight dry gum copolymer was obtained. This polymer was completely soluble in toluene.

Example 12

When any of the following cyclics are substituted for the cyclics of Example 4, good high polymers result:

(a) 204 g. of tetraphenylsilethylenesiloxane cyclic dimer, (b) 81 g. of $CF_3CH_2CH_2(CH_3)SiCH_2CH_2Si(CH_3)CH_2CH_2CF_3$ and 46.1 g. of $[ClC_6H_4(C_2H_5)SiO]_3$ cyclic, (c) 24 g. of $$\begin{array}{c} CH_2-CH_2 \\ | \quad\quad | \\ CH_2-CHSiCH_2CH_2Si \\ \diagdown \; O \; \diagup \\ | \\ CH_3 \end{array} \begin{array}{c} CH_3 \\ | \\ \end{array} \begin{array}{c} CH_3 \\ | \\ \end{array} \begin{array}{c} CH_2-CH_2 \\ | \quad\quad | \\ CH-CH_2, \end{array}$$

(d) 100 g. of $C_{18}H_{37}SiCH_2CH_2Si(CH_2CH_2CF_2CF_3)_2$.

Example 13

Equivalent results are obtained when any of the following liquids are employed in place of the toluene of Example 11: di-n-butylether, heptane, cyclohexane, butylacetate, perchloropropane, β,β'-dibromodiethylether and acetonitrile.

Example 14

When calcined barium oxide or calcined strontium oxide is substituted for the calcined calcium oxide in any of the preceding examples, equivalent results are obtained.

That which is claimed is:

1. A method comprising heating, under temperature conditions which do not cause decomposition of the organic catalysts,
    (1) a cyclic compound selected from the group consisting of
        (a) cyclotrisiloxanes of the unit formula $R_2SiO$ wherein each R is selected from the group consisting of monovalent hydrocarbon radicals, monovalent halohydrocarbon radicals and cyanoalkyl radicals, and
        (b) cyclic silethylenesiloxanes of the structure

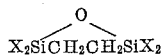

wherein each X is selected from the group consisting of monovalent hydrocarbon radicals free of aliphatic unsaturation, monovalent halohydrocarbon radicals free of aliphatic unsaturation and cyanoalkyl radicals, in contact with
    (2) a compound of the structure

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive,
whereby (1) is polymerized.

2. The method according to claim 1 wherein compound (2) is an alkali phenoxide.

3. The method according to claim 2 wherein for component (1)(a) R is a monovalent hydrocarbon radical, and for component (1)(b) X is a monovalent hydrocarbon radical free of aliphatic unsaturation.

4. The method of claim 3 wherein for component (1)(a) some of the R radicals are phenyl, some are methyl, and some are vinyl, and for component (1)(b) some of the X radicals are phenyl and some are methyl.

5. The method of claim 4 wherein component (1)(b) is

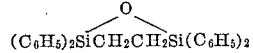

6. The method of claim 4 wherein component (1)(b) is

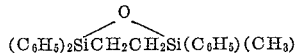

7. A method comprising heating, under temperature conditions which do not cause decomposition of the organic catalysts,
    (1) a cyclotrisiloxane of the unit formula $R_2SiO$ wherein each R is selected from the group consisting of monovalent hydrocarbon radicals, monovalent halohydrocarbon radicals and cyanoalkyl radicals in contact with
    (2) a compound of the structure

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of the alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive,
whereby (1) is polymerized.

8. The method of claim 7 wherein R is a monovalent hydrocarbon radical.

9. The method of claim 8 wherein part of the R radicals are methyl, part are phenyl and part are vinyl.

10. The method of claim 7 wherein component (1) is $[CF_3CH_2CH_2(CH_3)SiO]_3$ cyclic.

11. A method comprising heating, under temperature conditions which do not cause decomposition of the organic catalysts,
    (1) a cyclic silethylene of the structure

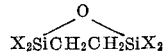

wherein each X is selected from the group consisting of monovalent hydrocarbon radicals free of aliphatic unsaturation, monovalent halohydrocarbon radicals free of aliphatic unsaturation and cyanoalkyl radicals, in contact with
    (2) a compound of the structure

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive,
whereby (1) is polymerized.

12. The method of claim 11 wherein component (2) is an alkali phenoxide.

13. The method of claim 12 wherein X is a monovalent hydrocarbon radical free of aliphatic unsaturation.

14. The method of claim 12 wherein component (1) is

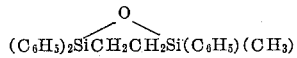

15. The method of claim 13 wherein X is phenyl.

16. The method of claim 12 wherein some of the X radicals are 3,3,3-trifluoropropyl and the remainder are methyl.

17. The method according to claim 16 wherein component (1) is

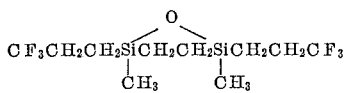

18. A method comprising heating, under temperature conditions which do not cause decomposition of the organic catalysts,
    (1) a cyclic compound selected from the group consisting of (a) cyclotrisiloxanes of the unit formula R₂SiO wherein each R is selected from the group consisting of monovalent hydrocarbon radicals, monovalent halohydrocarbon radicals and cyanoalkyl radicals, and (b) cyclic silethylenesiloxanes of the structure

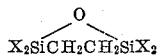

wherein each X is selected from the group consisting of monovalent hydrocarbon radicals free of aliphatic unsaturation, monovalent halohydrocarbon radicals free of aliphatic unsaturation and cyanoalkyl radicals, in contact with (2) a compound of the structure

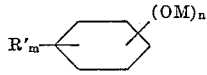

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive, and (3) a calcined oxide selected from the group consisting of calcium oxide, barium oxide and strontium oxide, whereby (1) is polymerized.

19. A method comprising heating, under temperature conditions which do not cause decomposition of the organic catalysts, (1) a cyclotrisiloxane of the unit formula R₂SiO wherein each R is selected from the group consisting of monovalent hydrocarbon radicals, monovalent halohydrocarbon radicals and cyanoalkyl radicals in contact with (2) a compound of the structure

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of the alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive, and (3) a calcined oxide selected from the group consisting of calcium oxide, barium oxide and strontium oxide, whereby (1) is polymerized.

20. A method comprising heating, under temperature conditions which do not cause decomposition of the organic catalysts, (1) a cyclic silethylene of the structure

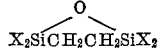

wherein each X is selected from the group consisting of monovalent hydrocarbon radicals free of aliphatic unsaturation, monovalent halohydrocarbon radicals free of aliphatic unsaturation and cyanoalkyl radicals, in contact with (2) a compound of the structure

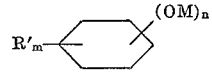

wherein R' is selected from the group consisting of monovalent hydrocarbon radicals, monovalent halohydrocarbon radicals, halogen atoms and monovalent hydrocarbonoxy radicals, each R' group containing up to about 10 carbon atoms, M is selected from the group consisting of alkali metals, tetraorganonitrogen radicals and tetraorganophosphorus radicals, the organic radicals of the said nitrogen and phosphorus radicals being selected from the group consisting of alkyl and aromatic radicals attached directly to the said nitrogen and phosphorus atoms, $m$ is an integer of from 0 to 3 inclusive, $n$ is an integer of from 1 to 3 inclusive, and $m+n$ is an integer of from 1 to 4 inclusive, and (3) a calcined oxide selected from the group consisting of calcium oxide, barium oxide and strontium oxide, whereby (1) is polymerized.

References Cited by the Examiner
UNITED STATES PATENTS

| | | | |
|---|---|---|---|
| 2,903,346 | 9/1959 | Coffield | 260—448.2 |
| 3,002,951 | 10/1961 | Johannson | 260—46.5 |
| 3,041,362 | 6/1962 | Merker | 260—448.2 |
| 3,202,634 | 8/1964 | Merker | 260—46.5 |

LEON J. BERCOVITZ, *Primary Examiner.*

M. I. MARQUIS, *Assistant Examiner.*